United States Patent
Garg et al.

(10) Patent No.: US 7,949,331 B1
(45) Date of Patent: *May 24, 2011

(54) VOICEMAIL SYSTEM WITH CALLING PARTY IDENTIFICATION

(75) Inventors: Amit Garg, Delran, NJ (US); Rajeev B. Patil, Holmdel, NJ (US); Jeffrey L. Tuttle, Hazlet, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/589,303

(22) Filed: Oct. 21, 2009

Related U.S. Application Data

(63) Continuation of application No. 11/273,047, filed on Nov. 14, 2005, now Pat. No. 7,623,850.

(60) Provisional application No. 60/628,937, filed on Nov. 18, 2004.

(51) Int. Cl.
*H04M 3/42* (2006.01)

(52) U.S. Cl. ..... 455/417; 370/230; 370/352; 379/88.12; 379/88.22; 379/198; 379/201.02; 379/114.01; 379/114.02; 379/201.05; 455/299; 455/406

(58) Field of Classification Search ................. 370/230, 370/352, 401; 379/88.12, 142, 88.19, 88.22, 379/114.01, 215.01; 455/406
See application file for complete search history.

(56) References Cited

U.S. PATENT DOCUMENTS

| | | | | |
|---|---|---|---|---|
| 4,878,240 | A * | 10/1989 | Lin et al. | 379/88.22 |
| 5,915,214 | A * | 6/1999 | Reece et al. | 455/406 |
| 6,668,045 | B1 * | 12/2003 | Mow | 379/88.19 |
| 6,798,868 | B1 * | 9/2004 | Montgomery et al. | 379/88.21 |
| 6,804,332 | B1 * | 10/2004 | Miner et al. | 379/88.13 |
| 7,010,100 | B1 * | 3/2006 | Garg et al. | 379/88.12 |
| 7,409,015 | B1 * | 8/2008 | Misra et al. | 375/329 |
| 2002/0181398 | A1 * | 12/2002 | Szlam | 370/230 |
| 2003/0023688 | A1 * | 1/2003 | Denenberg et al. | 709/206 |
| 2004/0076224 | A1 * | 4/2004 | Onggosanusi et al. | 375/144 |
| 2004/0136505 | A1 * | 7/2004 | Garg et al. | 379/88.12 |
| 2006/0018402 | A1 * | 1/2006 | Mehta et al. | 375/299 |

* cited by examiner

*Primary Examiner* — Nick Corsaro
*Assistant Examiner* — Joseph Arevalo

(57) ABSTRACT

A voicemail header is modified to provide caller ID information in connection with the delivery of voice mail. The header may include an audible alert signal as is used in call waiting to alert a caller ID box in the customer's premises that caller ID information follows. The caller ID information is then delivered as FSK signaling information for display on the caller ID display.

13 Claims, 2 Drawing Sheets

VOICEMAIL SYSTEM WITH CALLING PARTY IDENTIFICATION

CLAIM OF PRIORITY

This application is a continuation of application Ser. No. 11/273,047, entitled "Voicemail System with Calling Party Identification," filed Nov. 14, 2005, now U.S. Pat. No. 7,623,850, issued Nov. 24, 2009, which claims priority to U.S. Provisional Patent Application Ser. No. 60/628,937, filed Nov. 18, 2004, and entitled "Voicemail System with Calling Party Identification."

FIELD OF THE INVENTION

The present invention relates generally to providing voicemail services over a telecommunications network, and more particularly to techniques for providing to the callee the identity of a caller leaving a message.

BACKGROUND OF THE INVENTION

In today's voicemail systems, when a caller receives a message there is often no associated information identifying the calling party that left the message. Systems have been developed that provide the calling number (or name) as a verbal message that is part of the voicemail message, but those systems are relatively slow and cumbersome to use.

For example, U.S. Pat. No. 6,590,965 to Poole et al. discloses a voice mail system that offers a verbal announcement of name and number information when a subscriber reviews a mailbox. When a user selects an option to listen to received messages, the system provides an announcement of associated data, such as the name and number of the caller, as a synthesized speech signal to the subscriber. A voice processing unit runs a speech synthesis program to convert the caller ID text data to digitized audio. Alternatively, the subscriber may request the synthesized speech data while reviewing messages.

U.S. Pat. No. 6,785,368 to Eason et al. discusses an on-demand caller ID service wherein a voicemail response system repeats the telephone numbers and/or names associated with calling parties over a predetermined time period. The information is delivered as text-to-speech audio. The caller ID information is not associated with voice messages.

U.S. Pat. No. 5,943,397 to Gabin et al. discloses a network-assisted callback system wherein a subscriber who has missed a call dials an 800 number. The network accesses information about the caller that has been stored, in some embodiments including stored caller ID information. The system can automatically connect with the last calling party.

U.S. Pat. No. 5,748,709 to Sheerin discloses a method for programming a home answering machine to use caller ID data to automatically route individual messages to selected mailboxes, based on stored criteria.

There remains a need for a system that presents caller ID data to a subscriber in a way that is convenient and useable, is not time-consuming, and permits the review of the data without the need to listen to messages.

SUMMARY OF THE INVENTION

The present invention addresses the needs described above by providing a method and system for delivering a stored voice message to a subscriber in a telecommunications network. The method includes the steps of receiving from the subscriber a request to check a voice message, transmitting to the subscriber caller ID information associated with the stored voice message and containing at least a calling number of a party associated with the voice message, the caller ID information for displaying on a caller ID display, and transmitting to the subscriber the voice message.

The method may further include the step of transmitting to the subscriber a voice message header containing a caller ID display alert tone. The caller ID display alert tone may be a call waiting tone. The caller ID information may be a frequency-shifted keying (FSK) signal.

The method may further include the step of, after transmitting the caller ID information, receiving a message from the subscriber indicating whether to transmit the voice message. The caller ID information may contain a calling party name, and/or may contain a voice message date and time.

Another embodiment of the invention is a method for delivering a stored voice message to a subscriber in a telecommunications network, the stored message marked as new. The method includes the steps of receiving from the subscriber a request to check voice messages, and transmitting to the subscriber a signaling message containing caller ID information associated with the stored voice message, the caller ID information for displaying on a caller ID display. If a request to listen to the message is received from the subscriber, then the message is played to the subscriber and the message is marked as played. If no request to listen to the message is received from the subscriber, then the message is maintained marked as new.

The method may further include the step of transmitting to the subscriber a voice message header containing a caller ID display alert tone. The caller ID display alert tone may be a call waiting tone. The caller ID information may contain a calling party name.

Another embodiment of the invention is a voicemail platform for delivering a stored voice message to a subscriber in a telecommunications network. The platform comprises means for receiving from the subscriber a request to check a voice message, means for transmitting to the subscriber caller ID information associated with the stored voice message and containing at least a calling number of a party associated with the voice message, the caller ID information for displaying on a caller ID display, and means for transmitting to the subscriber the voice message.

The platform may further include means for transmitting to the subscriber a voice message header containing a caller ID display alert tone. The caller ID display alert tone may be a call waiting tone. The caller ID information may be an FSK signal.

The platform may further include means for, after transmitting the caller ID information, receiving a message from the subscriber indicating whether to transmit the voice message.

The caller ID information may contain a calling party name, or may contain a voice message date and time.

DESCRIPTION OF THE INVENTION

The present invention overcomes the above-described problems by displaying the "caller information" (calling party number, name of caller, date/time, etc) on a subscriber's conventional caller ID display as a message header for a retrieved message is playing. In the presently described invention, the way a voicemail platform plays message headers is modified, and the way by which the voicemail subscriber gets caller information is thereby modified.

Because the caller ID information is displayed on a display as the header is played, and is displayed before the subscriber listens to the message, the subscriber can use that information to decide the relative importance of the message and to choose to listen or to skip the message without going into the message. In that way, the "new" status of a message is preserved if the subscriber skips the message.

In a preferred embodiment of the invention, while playing the message header, the voicemail platform also plays an audible alert with an embedded call waiting signal to alert the caller ID display device. The voicemail platform then uses frequency-shifted keying (FSK) signaling, which is used in many conventional systems for caller ID, to pass calling party number and optionally name as well as a date and a time of the message. The technique of the invention provides a voicemail subscriber with caller ID information of the person who left a message without the subscriber needing to listen to the message.

Figure 1:
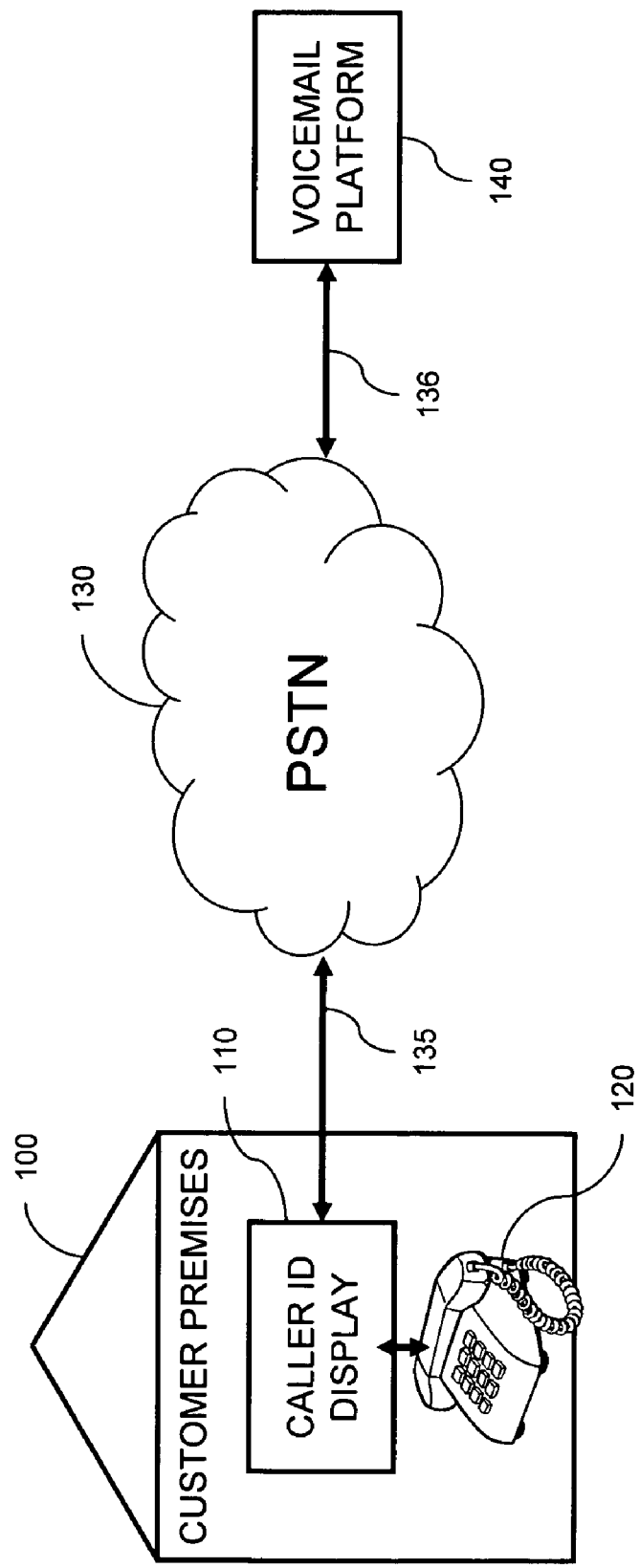
FIG. 1 is a schematic representation of a telecommunications system according to the invention.

Referring to FIG. 1, a caller using customer premises equipment (CPE) 120 utilizes the present invention by dialing into a voicemail platform 140 through a telecommunications network 130, such as the Public Switched Telephone Network (PSTN). The subscriber's premises 100 may be connected to the PSTN through a local exchange carrier (LEC) 135. The voicemail platform 140 may connected to the PSTN 130 through a LEC 136 or through another telecommunications carrier such as a long distance carrier. The subscriber may use a toll-free number such as an 8XX number to access the platform 140.

When the voicemail platform 140 receives a request to check messages, it searches its database to determine if there are any messages for the requesting subscriber. If so, the platform 140 sends an indication to the caller CPE 120 that there are messages in the voice mailbox. The subscriber can then opt to retrieve new messages.

The voicemail platform 140 transmits a "header" of the first new message through PSTN 130 and to a caller ID display 110 associated with the subscriber. In one embodiment of the invention, the same caller ID device used for identifying incoming calls is also used to identify messages in the presently described system. Alternatively, a separate "box" associated only with the voicemail system may be used to display the voicemail message identification information.

The header performs many of the same functions performed by a caller ID message that is transmitted by a local PSTN switch to a caller ID box during ringing. The header includes an in-band tone that indicates to the caller ID box that an FSK message is coming. Then, via FSK signaling, a message is transmitted containing calling party number, date and time, and optionally a calling party name. Those protocol steps are performed in existing caller ID systems to communicate caller ID information from a PSTN switch to a subscriber caller ID box. The present inventors have discovered a technique for using that underlying technology to assist a subscriber in accessing voice messages stored in a voice mail platform.

In accordance with the present invention, the caller ID display 110 is used to display the "caller information" transmitted by the voicemail platform during review of stored voice mail messages. That information may include one or more of the calling party name, the calling party number, the date of the call, the time of the call, or other information stored by the voicemail platform 140 in connection with a message. The subscriber may then use that information to decide the relative importance of the message and choose to either listen to the message or "skip" to the next new message. If the message is "skipped," it will retain its status as "new," since the message itself was not played, where it is considered preferable to retain that status.

In a currently preferred embodiment of the invention, while playing the message header, voicemail platform 140 also plays an audible alert signal (with an embedded call waiting signal) to alert the caller ID display device. The voicemail platform 140 then uses FSK signaling to pass the calling party number (and/or other data) to the caller ID display device. Advantageously, the use of the present invention eliminates the need for the subscriber to write down the name and telephone number associated with each voicemail message.

A similar technique may be used to convey other information to a display device during a call. For example, in response to a request by a subscriber for directory assistance, a directory service may send a requested phone number to the caller ID device. Data such as a company URL or a product code may be sent in conjunction with a voicemail message, eliminating any transcription errors.

Figure 2:
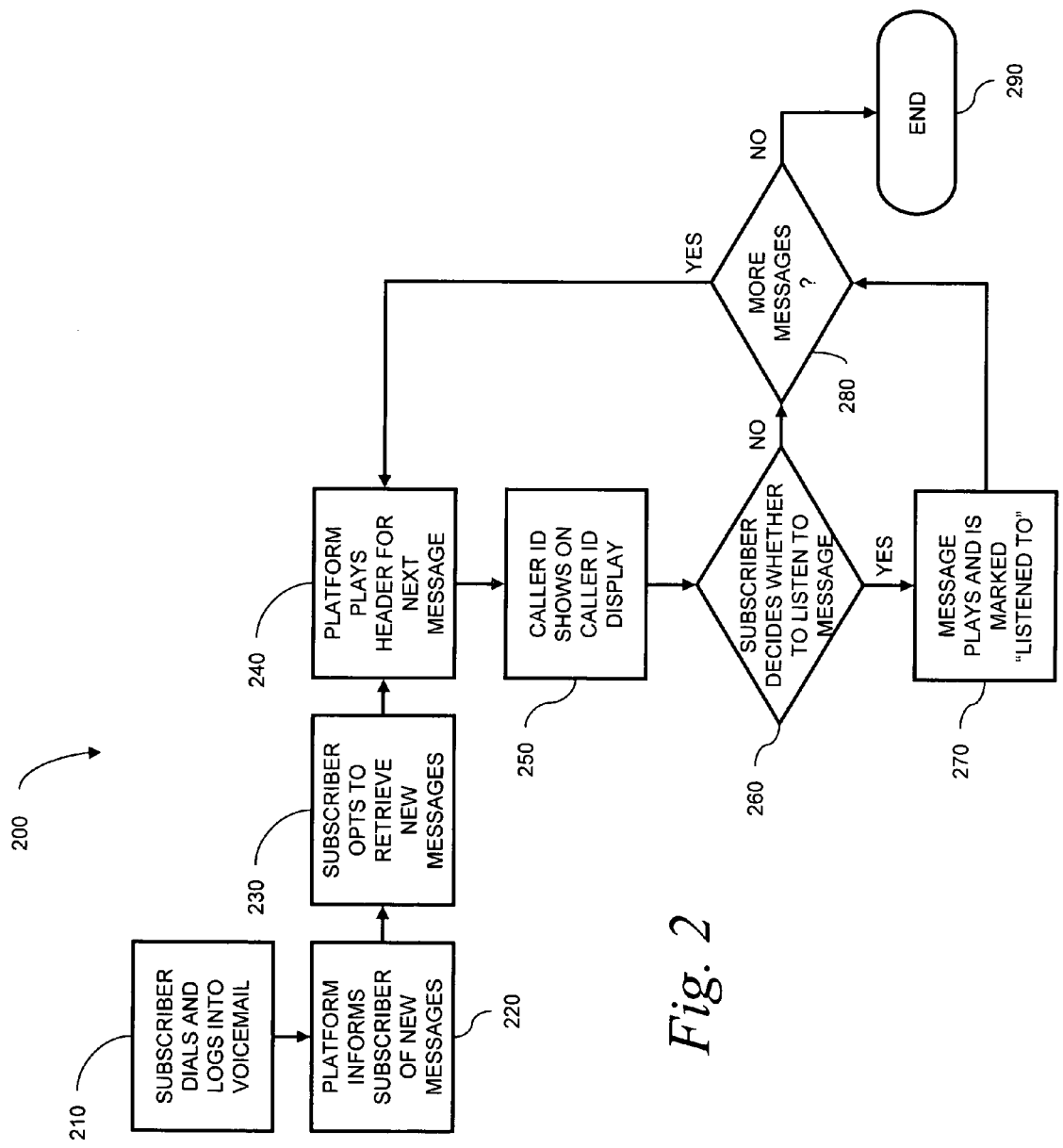
FIG. 2 is a flow chart showing a method according to one embodiment of the invention.

A method 200 according to one embodiment of the invention is shown schematically in FIG. 2. The method is initiated by a subscriber dialing and logging in to the voicemail system (step 210). Logging in may include dialing a toll-free number and entering a password. Alternatively, a dedicated function, such as a *YY sequence, may be used.

The voicemail platform then informs (step 220) the subscriber that there are new messages in the mailbox. The system, like conventional systems, differentiates between "new" messages that the subscriber has not yet listened, and "read" or "old" messages that have already been listened to by the subscriber. "New" messages are presented to the subscriber when messages are checked. "Old" messages are either discarded or stored after the subscriber listens to them.

The subscriber then can choose (step 230) to retrieve the new messages. The platform plays (step 240) the header of the next (in this case the first) message. The header includes an embedded call waiting signal that notifies the caller ID display in the subscriber's premises that display data will follow.

Caller ID data is then transmitted by the voicemail platform as FSK signaling and is shown (step 250) in the subscriber's caller ID display. Thus, the subscriber is able to identify the caller before hearing the message, therefore preserving the "new" status of the message. The subscriber is able to decide (step 260) whether to listen to the message or to skip the message without listening to it.

If the subscriber decides to listen to the message, the message is played (step 270) and marked "listened to" or "old." If the subscriber decides not to listen to the message after reviewing the caller ID data, the system checks (step 280) whether there are more messages. If so, the system plays the next header (step 240) and repeats the process. If there are no more messages, the sequence ends (step 290). The voicemail platform may then give the subscriber the opportunity to change settings or re-enter the method to play previously skipped messages.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to transmitting caller ID information in association with a voicemail message, the method and apparatus of the invention may be used to send any other information that may be advantageously associated with a voicemail message, such as a callback number. It is to be understood that the embodiments shown and described herein are only illustrative of the principles of the present invention and that various modifications may be implemented by those skilled in the art without departing from the scope and spirit of the invention.

What is claimed is:

1. A method for delivering at least first and second stored voice messages to a subscriber in a telecommunications network, the method comprising:
   in a voicemail platform of the telecommunications network, receiving from the subscriber a request to check for voice messages;
   in response to receiving from the subscriber the request to check for voice messages, transmitting to the subscriber a first voice message header of the first stored voice message containing a caller ID display alert tone, and transmitting to the subscriber an FSK signal comprising caller ID information associated with the first stored voice message and containing at least a calling number of a party associated with the first stored voice message, the caller ID information for displaying on a caller ID display;
   before transmitting to the subscriber a second voice message header of the second stored voice message, performing the following:
      receiving from the subscriber a decision whether to listen to the first stored voice message;
      transmitting to the subscriber the voice message when the decision is to listen to the stored voice message; and
      not transmitting to the subscriber the voice message and causing the stored voice message to retain its status as a new message when the decision is not to listen to the stored voice message; and
   transmitting to the subscriber the second voice message header of the second stored voice message.

2. The method of claim 1 wherein the caller ID display alert tone is a call waiting tone.

3. The method of claim 1, wherein the caller ID information contains a calling party name.

4. The method of claim 1, wherein the caller ID information contains a voice message date and time.

5. A voicemail platform for delivering at least first and second stored voice messages to a subscriber in a telecommunications network, the platform comprising:
   means for receiving from the subscriber a request to check for voice messages;
   means for, in response to receiving from the subscriber the request to check for voice messages, transmitting to the subscriber a first voice message header of the first stored voice message containing a caller ID display alert tone, and transmitting to the subscriber an FSK signal comprising caller ID information associated with the first stored voice message and containing at least a calling number of a party associated with the first stored voice message, the caller ID information for displaying on a caller ID display;
   means for, before transmitting to the subscriber a second voice message header of the second stored voice message, performing the following:
      receiving from the subscriber a decision whether to listen to the first stored voice message;
      transmitting to the subscriber the voice message when the decision is to listen to the stored voice message; and
      not transmitting to the subscriber the voice message and causing the stored voice message to retain its status as a new message when the decision is not to listen to the stored voice message and
   means for transmitting to the subscriber the second voice message header of the second stored voice message.

6. The platform of claim 5 wherein the caller ID display alert tone is a call waiting tone.

7. The platform of claim 5, wherein the caller ID information contains a calling party name.

8. The platform of claim 5, wherein the caller ID information contains a voice message date and time.

9. A method for retrieving first and second voice messages in a telecommunications network, the method comprising:
   from customer premises equipment (CPE), transmitting to a voicemail platform of the telecommunications network, a request to retrieve voice messages;
   at the CPE, receiving from the voicemail platform a first voice message header of the first stored voice message containing a caller ID display alert tone;
   at the CPE, receiving from the voicemail platform an FSK signal comprising caller ID information associated with the first stored voice message and containing at least a calling number of a party associated with the first voice message;
   displaying the caller ID information associated with the first stored voice message on a caller ID display;
   accepting from the subscriber a decision whether to listen to the first stored voice message;
   at the CPE, only if the decision is to listen to the first stored voice message, receiving the stored voice message from the voicemail platform and playing the stored voice message;
   only after accepting from the subscriber a decision whether to listen to the first stored voice message, receiving from the voicemail platform a second voice message header of the second stored voice message containing a caller ID display alert tone.

10. The method of claim 9 wherein the caller ID display alert tone is a call waiting tone.

11. The method of claim 9, further comprising:
   if the decision is not to listen to the stored voice message, then causing the first stored voice message to retain its status as a new message.

12. The method of claim 9, wherein the caller ID information contains a calling party name.

13. The method of claim 9, wherein the caller ID information contains a voice message date and time.

* * * * *